July 30, 1940.   T. D. SAUNDERS   2,209,937
GLASSWARE MOLD
Filed March 29, 1938   2 Sheets-Sheet 1
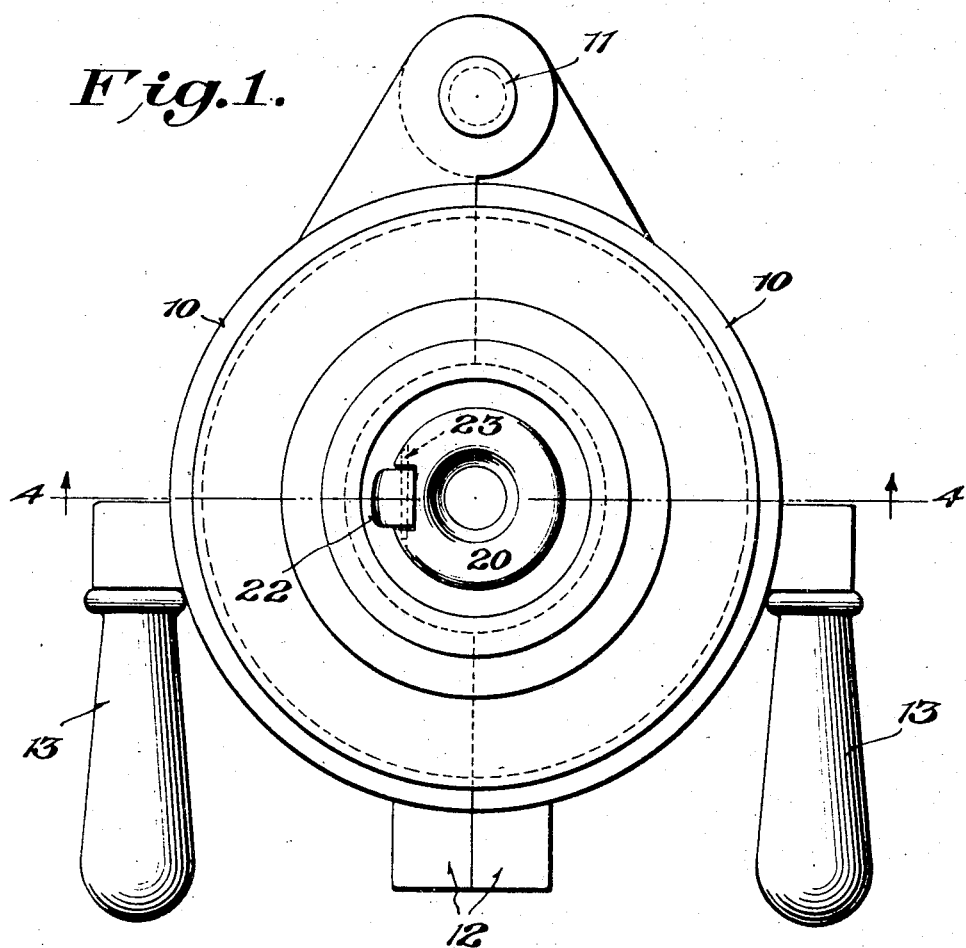
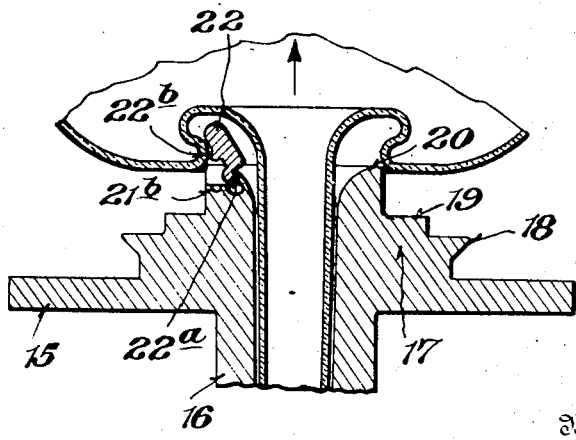
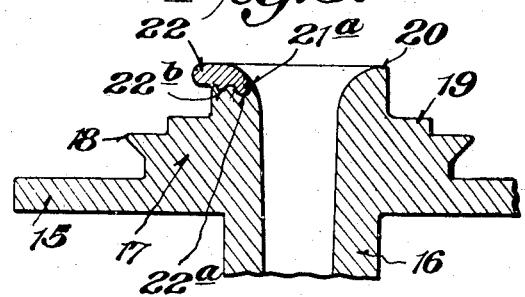
Inventor
Thomas D. Saunders,
By Royal E. Burnham,
Attorney July 30, 1940.  T. D. SAUNDERS  2,209,937
GLASSWARE MOLD
Filed March 29, 1938  2 Sheets-Sheet 2
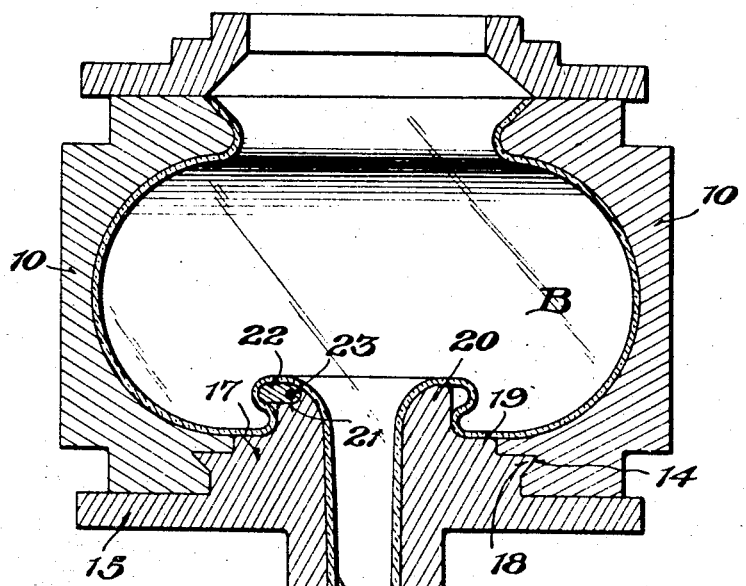
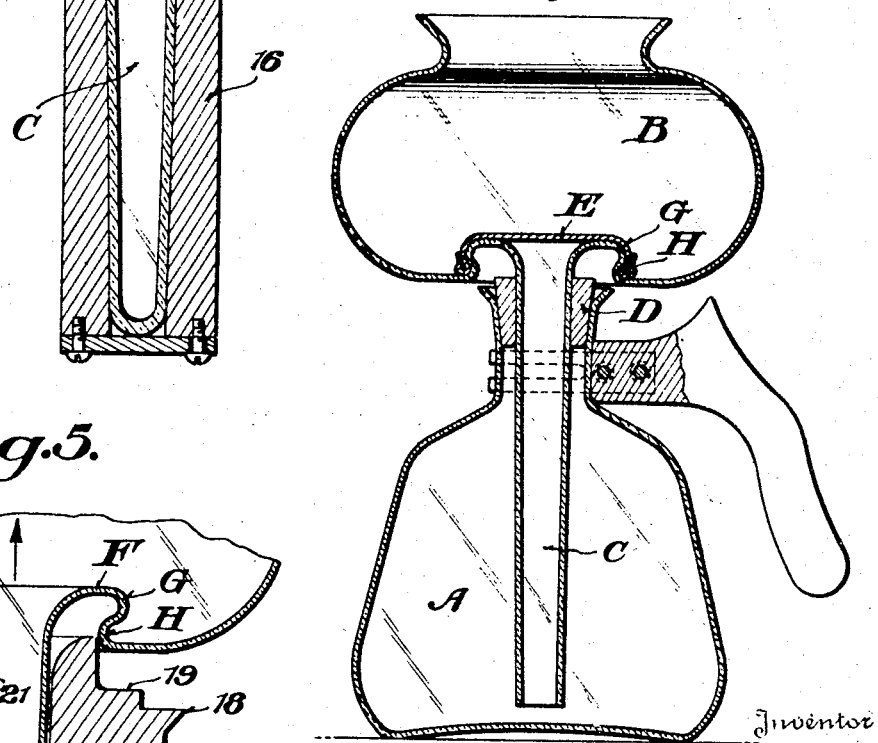
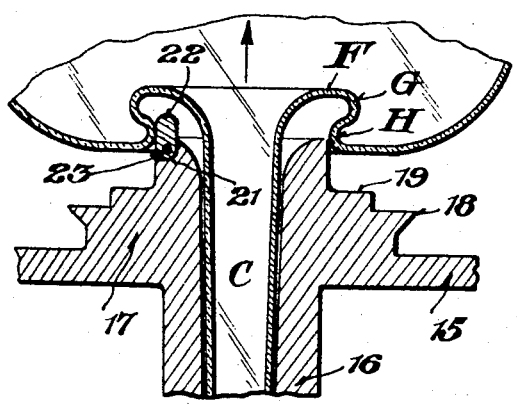
Inventor
Thomas D. Saunders,
By Royal E. Burnham,
Attorney Patented July 30, 1940

2,209,937

UNITED STATES PATENT OFFICE 2,209,937

GLASSWARE MOLD

Thomas D. Saunders, Dunbar, W. Va., assignor to Dunbar Glass Corporation, a corporation of West Virginia Application March 29, 1938, Serial No. 198,743

9 Claims. (Cl. 49—69)

This invention relates to mold formation of glassware of shapes that make it difficult, and sometimes impossible, to withdraw the article from the molds without breakage, unless special precautions are taken.

It is an object of the invention to provide a mold in which glass articles of this character may be formed to shape by a blowing method and from which they easily may be withdrawn without much resistance by mold parts, whereby breakage is avoided.

When considered with the description herein, characteristics of the invention are apparent in the accompanying drawings, forming part hereof, wherein adaptations of the invention, for production of articles of the kind hereinafter particularly referred to, are disclosed for purposes of illustration.

While the disclosures herein exemplify what now are considered to be preferable embodiments of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which—

Fig. 1 is a top view of the device;
Fig. 2 is a sectional view showing an alternative form of mold element in displaced position;

Fig. 3 is a sectional view showing a mold element of that form in operative position;

Fig. 4 is a vertical section on the line 4—4, Fig. 1;

Fig. 5 is a fragmentary vertical section;

Fig. 6 is a sectional view of a utensil having an upper stemmed bowl such as may be made in the device.

This invention particularly is adapted for use in production of articles such as the upper stemmed bowls of coffee-makers of the kind illustrated in Fig. 6, which is disclosed for better understanding of the mold characteristics.

Such a utensil includes a lower bowl A to contain water, an upper bowl B to contain ground coffee, and a hollow somewhat tapered stem C integrally formed with and extending downwardly from the bottom of the upper bowl into the lower bowl and nearly to the bottom of the latter. The stem is disposed through a sealing member D in the neck of the lower bowl. A filter-cloth E in the bottom of the upper bowl extends across the end of the stem-passage. In order to afford means for holding the filter-cloth in place, the bottom of the upper bowl is raised as a circular protuberance F at its juncture with the stem, and it is formed with a radially-extending shoulder G below which there is an annular groove H for accommodation of a draw string or spring ring to engage and hold the filter-cloth. When heat is applied to the lower bowl and vapor generated therein, water is forced upwardly through the stem into coffee in the upper bowl. After removal of the lower bowl from heat action and on condensation of the vapor therein, the infusion in the upper bowl is drawn down through the stem into the lower bowl.

In making these stemmed upper bowls, difficulty has been met in withdrawing them upwardly from the mold because of disposition of a mold part in the groove behind the filter-retaining annular shoulder. The mold of this invention avoids that difficulty.

The mold includes a pair of upper separable mold sections 10 shaped inside in conformity with the bowl of the article to be formed therein, and they are hinged at 11 in any suitable manner. They have lugs 12 for cooperation with means well known in the art for holding them closed, and handles 13 are provided for opening and closing the sections. The mold sections are formed at their bases with an annular internal substantially V-shaped groove 14. The mold sections 10 are capable of sliding opening and closing movement on a flat base part 15.

A mold 16, to form the somewhat tapered stem of the bowl, extends downwardly from the base 15, and it also protrudes above the base as a circular centrally-positioned mold part 17, around which is formed the raised portion of the bottom of the bowl for holding the filter-cloth. The mold part 17 has an annular radially-extending flange 18 near its base, which seats in the groove 14 of the upper mold sections when they are closed to give the requisite close joint of the parts.

Above the flange 18, the mold part 17 has a ledge 19 against the side of which the edges of the upper mold parts above the groove abut when those parts are closed, the top of the ledge then constituting a continuation of the upper mold surface. The mold part 17 above the ledge is a top portion 20 shaped in conformity of the interior of the raised part of the bowl bottom, and it has an approximately flat top with a rounded peripheral corner.

The mold top 20 is formed with a depression 21 that extends from the periphery toward the center. The depression constitutes a seat for a mold element 22 for formation of the filter-retaining shoulder of the bowl.

The element 22 is disposed normally in the seat with its upper surface in substantially the same plane as the top of the mold part 20. Its outer portion projects radially beyond the side to the extent required for formation of the desired size of shoulder, and it is rounded as shown.

The element 22 and its seat 21 are so relatively proportioned that the element easily may be displaced upwardly from normal or operative position by the bowl itself when the latter is being withdrawn from the mold, after the upper mold sections are opened subsequent to completion of the blowing operation, so that it offers no breaking resistance inside of the filter-retaining shoulder.

In one form, as shown in Figs. 1, 4, and 5, the element 22 is hinged at its inner end on a pivot-pin 23, which extends into the mold part 20, so that the element may tilt or swing upwardly and be displaced at its outer end out of the seat and withdraw from the shoulder groove as the article is withdrawn.

In some instances, it is not necessary to hinge the element 22 to the mold top 20 on a pin or the like. It may be somewhat loosely disposed in the seat 21, as shown in Figs. 2 and 3. Tipping of the element, if down pressure on the outer end by glass being molded exceeds that on the inner end, may be prevented by shaping certain parts as shown. The seat has an overhanging shoulder 21—a at its inner end, under which an inner reduced end 22—a of the element is shaped to fit. The element may have a lug 22—b on its bottom to cooperate with a depression 21—b in the bottom of the seat to prevent the element from sliding horizontally out of the seat.

In the formation of articles in the device, a batch of glass in plastic condition on a blow-pipe is blown and expanded in the closed upper mold against the side thereof to form the bowl and down into the lower mold to form the attached stem. During the blowing, the glass is rotated by twisting the blow-pipe, to produce the desired smoothing action, and also for formation of the circular filter-retaining shoulder over the end of the mold element 22. It has been found in practical use of the mold that sufficient turning movement of the glass against the projecting end of that element readily may be accomplished to form that shoulder continuously around the periphery of the raised portion of the bowl bottom while the glass is plastic.

When the article is to be withdrawn from the mold for subsequent finishing, the upper mold sections are opened, and the stem is pulled out of its mold. The mold element 22, which on completion of blowing extends into the groove inside of the filter-retaining shoulder, is tilted or swung upwardly at its outer end and displaced from its normal position in its seat and released from the groove by contact therewith of the lower wall of the groove. Thus the mold element releases itself from the groove. Its resistance to displacement and release is not sufficient to cause breakage at the shoulder.

With the hinged form of mold element 22, all that is necessary to return it to its normal position in its seat for the next forming operation, if it does not return itself, is to push it down. With the loose or unhinged form of element 22, if it has fallen out of the seat during withdrawal of a formed article, it is easy to put it back; and, if it has not entirely left the seat and does not of itself return, it may be pushed back to normal position.

I claim:

1. A device for blowing formation of glassware comprising a mold part, a mold element hinged to said mold part and normally extending laterally therefrom and being upwardly swingable, and separable side mold members mounted adjacent to said mold part and movable to close therearound to form a mold cavity therewith.

2. A device for blowing formation of glassware comprising a mold part having a seat in its top, a mold element hinged in said seat normally extending laterally from said mold part and being upwardly swingable, and separable side mold members mounted adjacent to said mold part and movable to close therearound to form a mold cavity therewith.

3. A device for blowing formation of glassware comprising a mold part having a seat in its top, said seat having an overhanging shoulder, a mold element loosely disposed in said seat, normally extending laterally from said mold part, and extending at its inner end under said shoulder, said element being swingable upwardly of its seat, and separable side mold members mounted adjacent to said mold part and movable to close therearound to form a mold cavity therewith.

4. A device for blowing formation of glassware comprising a mold part having a seat in its top, said seat having an overhanging shoulder, a mold element loosely disposed in said seat, normally extending laterally from said mold part, and extending at its inner end under said shoulder, means to prevent lateral movement of said element in its seat, said element being swingable upwardly of its seat, and separable side mold members mounted adjacent to said mold part and movable to close therearound to form a mold cavity therewith.

5. A device for formation of glassware, comprising an interior mold part, separable side mold members mounted adjacent to said mold part and movable to close therearound to form a mold cavity therewith, and a mold element swingably mounted on said mold part and normally extending laterally therefrom, said mold element being adapted to be swung upwardly therefrom by a formed article during withdrawal of the latter from the mold.

6. A device for formation of glassware comprising an interior circular mold part, separable side mold members mounted adjacent to said mold part and movable to close therearound to form a mold cavity therewith, and a mold element tiltably mounted on said mold part and normally extending radially therefrom, said mold element being adapted to be tilted upwardly from that position toward the axis of said mold part by a formed article during withdrawal of the latter from the mold.

7. A device for formation of glassware comprising an interior mold part having a seat in its top, separable side mold members mounted adjacent to said mold part and movable to close therearound to form a mold cavity therewith, and a mold element swingably mounted in said seat and normally extending laterally therebeyond, said mold element being adapted to be swung upwardly toward the axis of said mold part.

8. A device for formation of glassware comprising an interior mold part, separable side mold members mounted adjacent to said mold part and movable to close therearound to form a mold cavity therewith, and a mold element swingably mounted on said mold part and normally extending laterally from its upper portion, said mold element being adapted to swing upwardly toward the axis of said mold part during withdrawal of a formed article from the mold.

9. A device for formation of glassware comprising a base, a stem mold having a mold part above said base, a mold element swingably mounted on said mold part normally extending laterally from its upper portion, said mold element being adapted to be moved upwardly by a formed article during its withdrawal from the mold device, and separable side mold members on said base and movable thereon to close around said mold part below said mold element to form a mold cavity with said mold part.

THOMAS D. SAUNDERS.